United States Patent [19]

Rambauske et al.

[11] 4,074,416
[45] Feb. 21, 1978

[54] MIRROR AND METHOD OF MAKING SAME

[75] Inventors: Werner R. Rambauske, Carlisle; John J. Grabowski, Andover, both of Mass.

[73] Assignee: Raytheon Company, Lexington, Mass.

[21] Appl. No.: 722,844

[22] Filed: Sept. 13, 1976

Related U.S. Application Data

[60] Division of Ser. No. 463,697, April 24, 1974, which is a continuation-in-part of Ser. No. 268,271, July 3, 1972, Pat. No. 3,841,737.

[51] Int. Cl.² .............................................. B22D 11/26
[52] U.S. Cl. ................................. 29/527.4; 29/527.3; 427/34; 164/76; 350/320; 350/310; 350/288; 51/50 PC; 51/101 LG; 51/284 R; 51/100 P; 51/165 TP; 51/165.71; 51/DIG. 14; 51/165.91; 51/165.85
[58] Field of Search ................. 427/34; 350/288, 310, 350/320; 29/527.4, 527.3, 527.6; 51/33 W, 35, 50 PC, 95 WH, 100 P, 101 R, 101 LG, 283 R, 284 R, 165.85, 165.89, 165.79, 165.9, 165.91, 165 TP, 165.71, DIG. 14

[56] References Cited

U.S. PATENT DOCUMENTS

| | | | |
|---|---|---|---|
| 537,126 | 4/1895 | Schuckert | 51/50 PC |
| 2,600,402 | 6/1952 | Griffin | 51/100 P |
| 2,681,595 | 6/1954 | LeComte | 51/101 R X |
| 3,041,789 | 7/1962 | Cretin-Maitenaz | 51/101 R |
| 3,075,320 | 1/1963 | Hernley | 51/101 R X |
| 3,283,117 | 11/1966 | Holmes et al. | 427/34 |
| 3,497,377 | 2/1970 | Allingham | 350/288 X |
| 3,609,589 | 9/1971 | Hufnagel | 331/94.5 |
| 3,782,042 | 1/1974 | Strasbaugh | 51/284 X |
| 3,790,257 | 2/1974 | Goldstein et al. | 350/310 |
| 3,936,295 | 2/1976 | Cromwell et al. | 427/34 |

OTHER PUBLICATIONS

Machinery's Handbook, 7th Ed., by The Industrial Press, pp. 1526 & 1666.
"New Technique for Nearly Perfect Laser Mirrors," "Bell Laboratories Record," vol. 42, No. 11, Dec. 1964, pp. 412-414.

Primary Examiner—C.W. Lanham
Assistant Examiner—V. Rising
Attorney, Agent, or Firm—Philip J. McFarland; Joseph D. Pannone

[57] ABSTRACT

A mirror, and method of making same, is disclosed. The mirror includes a metallic base material having a low coefficient of thermal expansion, an intermediate layer bonded to the base by a plasma spray process and a reflecting surface overlying the intermediate layer, the coefficients of thermal expansion of the materials of the intermediate layer and the reflecting surface differing from each other and from the coefficient of thermal expansion of the base material.

The disclosed method contemplates: The casting of a mirror blank from a material having a low coefficient of thermal expansion and machining the surface to a desired contour, with stress-relieving heat treatments before and after such machining; plasma spraying an intermediate coating of a material having a Rockwell hardness equal to, or greater than, 60; grinding the intermediate coating to a desired contour and lapping and cleaning such ground coating to produce an optically smooth contoured surface; and finally plating such surface to provide the desired mirror surface.

2 Claims, 4 Drawing Figures

MIRROR AND METHOD OF MAKING SAME

CROSS-REFERENCE TO RELATED CASES

This is a division of application Ser. No. 463,697, filed Apr. 24, 1974, which application in turn is a continuation-in-part of application Ser. No. 268,271 filed on July 3, 1972, now U.S. Pat. No. 3,841,737, issued Oct. 15, 1974.

BACKGROUND OF THE INVENTION

This invention pertains generally to catoptric lens arrangements and particularly to such types of arrangements having lens elements with focal points spaced from the lens axis.

This application is a continuation-in-part of our co-pending application entitled "Mirror and Method of Making Same," Ser. No. 268,271, filed July 3, 1972 and assigned to the same assignee as this application.

It is now known in the art that so-called "confocal" catoptric lens arrangements, i.e. arrangements incorporating reflecting surfaces corresponding to the curved surface generated by nutating selected quadratic conic sections about a lens axis, combine many desirable qualities. Reflecting surfaces so generated characteristically possess image points on a circle, or an arc of a circle, centered on an axis rather than a single point as in the usual case. Thus, by judiciously selecting particular conic sections for the generatrices of the reflecting surfaces of the elements of a catoptric lens arrangement, it is possible to design such an arrangement to be diffraction-limited with an extremely large aperture. It follows, then, that the f-number of such a lens arrangement may be far less than 1. Such a characteristic, in turn, means that radiant energy from a point source may, if desired, be focused within a very small circle of confusion; as a matter of fact, focusing may take place within a circle of confusion with a diameter in the same order as the wavelength of radiant energy. Alternatively, if desired, an almost perfectly collimated beam of radiant energy may be formed from radiant energy from a point source, because the diffraction effects suffered by such a catoptric lens arrangement are very small.

It is evident that confocal catoptric lens arrangements are particularly well suited for applications in which conventional refractive lens arrangements are, for one reason or another, not satisfactory. For example, when the radiant energy to be focused or collimated is concentrated in an intense beam, as in the beam from a high-powered laser, a sufficient amount of such energy incident on a refractive lens arrangement is absorbed by the material from which the lens elements are fabricated (some type of glass, mica or other solid material ordinarily deemed to be totally transparent) thereby causing undue heating which distorts, or even destroys, the lens elements.

Although a catoptric lens arrangement is not as susceptible to damage from overheating because energy passing through such an arrangement is almost completely reflected by the mirror surfaces of the lens elements, there is, however, a slight amount of energy absorbed by each lens element to cause heating. Therefore, especially when it is necessary to combine beams from more than a single high powered laser, even catoptric lens arrangements may be unduly heated. There simply is no known way of making the reflecting surface of lens elements in a catoptric lens arrangement to provide reflecting surfaces which are certain to withstand the enormous concentrations of energy resulting from the use of several high power lasers. Further, with any catoptric lens arrangement not using confocality principles, appreciable aperture blockage must be tolerated in order to arrange the lens elements in proper relative position with respect to each other.

It has been proposed to carry out thermal nuclear fusion by combining the beams from a number of high powered lasers in such a manner that the energy in each beam is focused on a small target. It is possible in such a system to obtain a flux density at the target which is sufficiently high to initiate the fusion reaction. That is, a flux density in the order of $10^{14}$ to $10^{16}$ watts per square centimeter may be attained. When energy with a flux density of such intensity is attained, a concomitant light pressure (in the order of the pressure required to contain the expanding plasma resulting from a nuclear reaction) is generated. Obviously, however, successful containment of an expanding plasma from a real specimen undergoing fusion requires that the light pressure be applied over a continuous finite area. In other words, any lens arrangement suited to the purpose must be capable of forming an "optical bottle."

In the design of optical radars it would be highly desirable to combine beams from several lasers into a composite beam, thereby to increase the effective range of the system. Again, in such an application conventional lens arrangements are inadequate for the basic reason that it is almost impossible to collimate energy from more than one source into a single beam. Using conventional lens elements, which have their focal points on a lens axis, in practice only one laser beam may be collimated by any particular known lens arrangement.

It has been proposed that numerically controlled lathes be used to turn mirror surfaces for catoptric arrangements such as those mentioned above. If such a lathe is used to turn an optically smooth mirror surface (meaning a surface which, after lapping, conforms to a desired shape within a fraction of a wavelength of the radiant energy to be reflected) the precision with which the turning operation must be carried out makes it extremely difficult to machine any but relatively small and simple mirror surfaces. Some of the critical parameters are: (1) machine accuracy; (2) precision of control of turning speed and feed; and (3) hardness of the material on which the mirror surface is to be formed.

Machine accuracy encompasses the usual considerations required to be met by any precision lathe used for "micromachining." First of all, then, extreme care in the mechanical design and construction of the lathe itself must be taken to reduce errors such as those resulting from bearing runout of the spindle of the lathe or backlash in the lead screw of the lathe. Because control of the relative positions of the cutting tool and the workpiece is determined by successive outputs of a controlling digital computer, successive ones of such positions are separated by discrete amounts. Obviously, then, if the final surface must correspond to a given curve within a tolerance, say in the order of one micron, the incremental changes in the output of the controlling digital computer must be less than tolerance permitted for error in the final surface. Such a requirement in turn means that the programming of the controlling digital computer is detailed or the memory of such computer is very large to contain a very large number of positioned control signals.

Machining a mirror surface on a numerically controlled lathe requires, for satisfactory results, that the relative linear speed between the cutting tool and the workpiece be held almost constant during each machining pass. That is, the "surface feet per minute" of material removed from the workpiece must be maintained at a constant value to avoid wave-like distortions in the finished mirror surface. While "surface feet per minute" may be maintained at a constant value by correspondingly maintaining spindle speed when turning a cylindrical mirror surface, a different situation obtains when any other shape of mirror surface is desired. In any such situation, it is necessary that, during any given pass, the spindle speed be varied in a manner dependent upon the particular curve being machined. This requirement, in turn, means that the controlling digital computer should be adapted to control spindle speed in a different way for each differently shaped mirror surface.

Whenever a mirror surface is to be turned on a numerically controlled lathe, it is particularly important that the sharpness of the cutting tool not change appreciably during any pass. It has been found, however, that even diamond-tipped cutting tools are susceptible to excessive wear if the material of the workpiece is other than a relatively soft material, as gold, silver or copper. Unfortunately, however, satisfactory turning of such materials requires that the surface feet per minute be maintained within extremely close tolerances during each pass to avoid wave-like distortions in the final mirror surface. Therefore, only relatively small mirror surfaces of relatively simple shapes may be produced even with the most sophisticated and accurate known numerically controlled lathes.

SUMMARY OF THE INVENTION

Therefore, it is a primary object of this invention to provide an improved mirror, and method of making same, adapted to withstand high flux densities without damaging its optical qualities.

Another object of this invention is to provide an improved mirror especially well adapted for use in the infrared portion of the electromagnetic spectrum.

Still another object of this invention is to provide an improved mirror having a reflective surface which is highly resistant to tarnishing.

These and other objects of this invention are attained generally in a preferred embodiment by bonding a primary intermediate layer of tungsten carbide with a cobalt binder to a base formed as a mirror blank, the base being a nickel-iron alloy having a low coefficient of thermal expansion and the bonding of the primary intermediate layer being accomplished by a plasma spray process. Additional intermediate layers of copper and silver are than applied to the primary intermediate layer after it is machined and a reflecting surface of gold is finally applied. The base preferably is honeycombed, without affecting its structural integrity, so as to permit incorporation of different types of forced cooling means so as to permit incorporation of different types of forced cooling means. For example, the base may have formed in it cooling coils through which a liquid or gaseous refrigerant may be passed or, alternatively, may have the pores of the honeycomb filled with a highly conductive material as copper to conduct heat to a heat sink.

BRIEF DESCRIPTION OF THE DRAWINGS

For a more complete understanding of this invention, reference is now made to the following description of the accompanying drawings, wherein

FIG. 2A is a plan view, again greatly simplified, showing how a lapping tool may be substituted for a grinding wheel in the machine setup of FIG. 2.

DESCRIPTION OF THE PREFERRED EMBODIMENT

Figure 1:
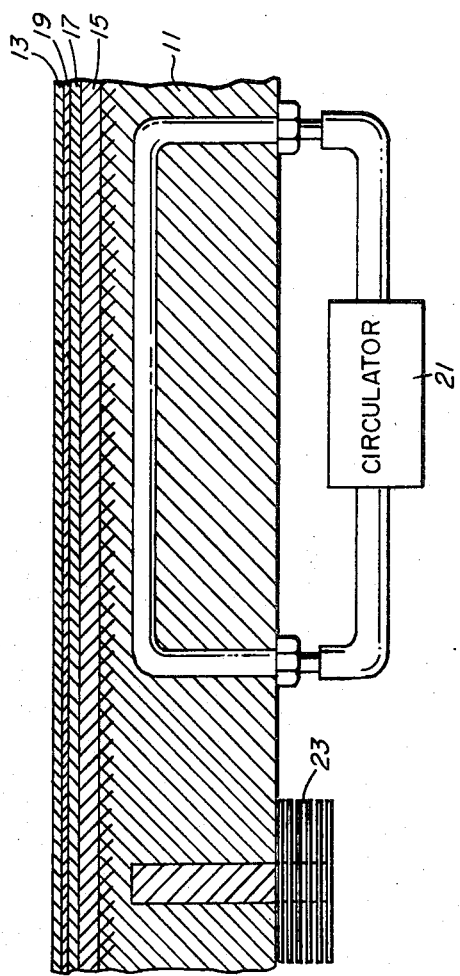
FIG. 1 is a cross-sectional view, somewhat simplified, of a finished mirror, the thicknesses of the various materials not being to scale for purposes of illustration.

Referring now to FIG. 1, it may be seen that a finished mirror made according to this invention comprises a base 11 on which a mirror surface 13 is supported by intermediate layers 15, 17, 19. The base 11 is cast from the alloy "Ni-Resist-Fe(5)" to provide one surface shaped generally to the contour of the finished mirror. "Ni-Resist-Fe(5)" has the following composition, by weight:

Nickel — 34–36%
Carbon — 2.40%
Silicon — 1–2%
Manganese — 0.40–0.80%
Chromium — 0.17%
The remainder iron After casting, the surface of the base 11 is machined in any conventional manner to form a mirror blank. This is, the surface of the base 11 is machined so that its contour matches the contour of the finished mirror, with proper allowance being made for the thickness of the intermediate layers 15, 17, 19 and of the mirror surface 13 (if the finished mirror is to be curved). The surface of the base 11 is coated with a relatively thick layer of tungsten carbide with a cobalt binder by a plasma spray process. In such a process, an electrode fabricated, for example, from (by weight) tungsten carbide, 85%, and a cobalt binder, 15%, designated LW-1N40 by Union Carbide Corporation, New York, N.Y. is centered in a tubular water-cooled nozzle (not shown) having a constricted tip. When a gas, as acetylene, is introduced to the nozzle and a DC voltage of, say 250 volts, is applied between the base 11 (as the anode) and the tungsten electrode (as the cathode) an arc may be struck between the base 11 and the tungsten electrode, such arc containing ions of the electrode material. Then, by properly adjusting the travel of the nozzle by moving either the base 11 or the nozzle over the surface of the base 11, the ions from the electrode in the arc may be distributed over the surface of the base 11 to form an overlying layer of the electrode material approximating the desired primary intermediate layer 15. It has been found that the ions in the plasma spray first penetrate the surface of the base 11 and then are built up to a thickness of, say, 0.010 to 0.015 inches as the plasma spray is moved relative to the base 11. Obviously, then, such an intimate contact is made that the primary intermediate layer 15 is firmly bonded to the base 11. In operation, therefore, even though there may be a substantial difference between the coefficient of thermal expansion of the material in the intermediate layer 15 and the material in the base 11, the temperature gradient through the primary intermediate layer 15 to the base 11 is reduced to an insignificant amount. As a result, thermally induced stresses between the base 11 and the primary intermediate layer 15 are practically eliminated. The primary intermediate layer 15 (which has the machining characteristics of tungsten carbide, may be contoured as desired by grinding to its required shape (allowance being made for the remaining intermediate layers and the reflecting surface).

The intermediate layer 17 is formed by electrolytically depositing copper on the primary intermediate layer 15. The contour of the exposed surface of the intermediate layer 17 then follows the contour of the primary intermediate layer 15. Because of the high thermal conductivity of copper, the intermediate layer 17 practically eliminates thermally induced shear forces between the intermediate layer 15 and the actual reflecting surface.

When, as here, the finished mirror is to be used to reflect optical energy in the infrared portion of the electromagnetic spectrum, the mirror surface 13 preferably is gold. In order to inhibit migration between the copper of the intermediate layer 17 and the gold in such a mirror surface, the exposed surface of the intermediate layer 17 is flashed with silver to form an intermediate layer 19. The mirror surface 13 is then formed by depositing, in any convenient manner, gold on the exposed surface of the intermediate layer 19.

It will now be evident that, once the primary intermediate layer 15 is bonded to the base 11 and contoured as required, changes in construction may be made to form elements for different applications. Thus, if the finished mirror is intended for use in applications in which thermal shocks are not to be experienced, the intermediate layer 17 is not absolutely required. Further, if the finished mirror is intended to be used to reflect optical energy in the visible range, rhodium, silver, aluminum or beryllium may be used in place of gold for the mirror surface.

The base 11, although it may be a solid cast unit, preferably is honeycombed. This type of structure reduces the weight of the finished mirror without adversely affecting its structural integrity. Further, forced cooling may then be incorporated in the base 11. Thus, for example, a circulator 21 (as a compressor and a condenser) may be connected as shown to pass a refrigerant through an evaporator (here a coil, not numbered,) embedded in the base 11. Alternatively, holes in the base 11 may be filled with a highly conductive material, as copper, to conduct heat in the base 11 to a heat sink 23.

Figure 2:
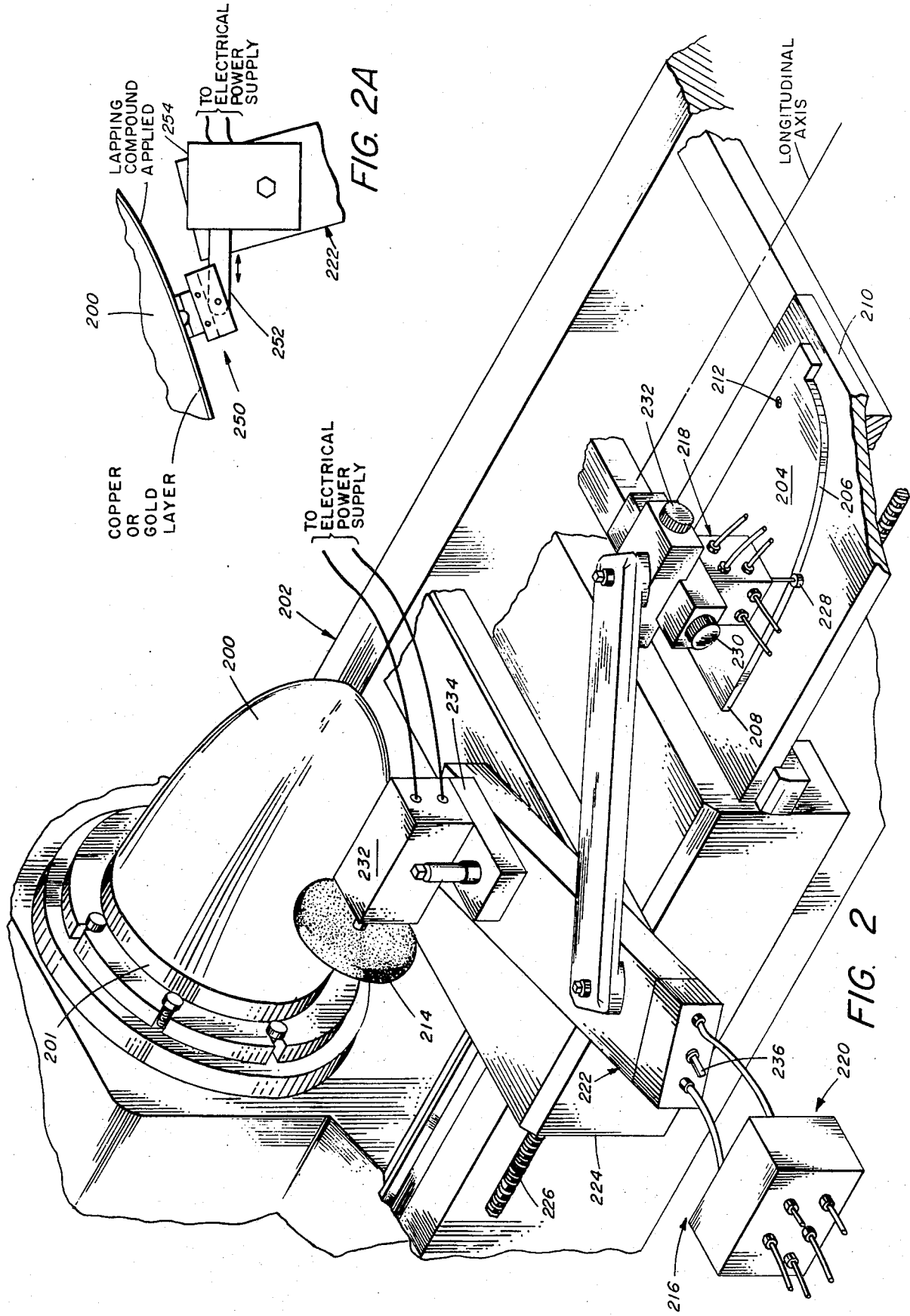
FIG. 2 is a plan view, greatly simplified for clarity, of the machine setup for grinding according to the contemplated method.

Before referring to FIGS. 2 and 2A in detail, it will be noted that the machine setup for turning, grinding and lapping as contemplated by this invention incorporates a conventional horizontal lathe with the transverse position of the tool (a grinding wheel in FIG. 2 and a lapping tool in FIG. 2A) controlled by operation of a conventional hydraulic pantograph. Thus, in a machine setup actually used to machine both convex and concave mirrors, a standard machine shop lathe (a 25 inch Axelson lathe manufactured by the Axelson Division of U.S. Industries, Los Angeles, California) and a hydraulic pantograph ("Copy-Rite" Model CR-10 manufactured by Allied Machine Tool Systems, Santa Fe Springs, Calif.) were used. Because such machines are known in the art, neither are shown in any particular detail and only those parts required for an understanding of the invention are illustrated.

With the foregoing in mind it may be seen that a workpiece 200 (here a coated blank for a convex mirror and an uncoated cylindrical reference area 201) is mounted on the chuck (not numbered) of a horizontal lathe 202 and aligned with the longitudinal axis of such horizontal lathe. The reference area 201 here is machined in any convenient manner to a radius equal to the radius, after grinding, of the case of the coated blank. Such dimension then serves as a reference during grinding to determine when the coated blank has been ground to size. It will be evident that a reference area (or areas) for blanks for concave mirrors may similarly be turned. A template 204 (having a curved reference surface 206 corresponding to the desired longitudinal profile of the desired reflecting surface and a cylindrical reference area 208 having a radius equal to the radius of the reference area 201) is also aligned parallel with the longitudinal axis of the horizontal lathe 202. While any convenient alignment arrangement may be used, it is here chosen to mount the template 204 on a base plate 210 secured to the bed of the horizontal lathe 202, such base plate 210 having a pair of locating pins 212 (the top of one being visible in FIG. 2) which mate with corresponding locating holes (not numbered) in the template 204.

With the workpiece 200 and the template 204 aligned, the selected tool (herein a grinding wheel 214 shown in position approximately midway through a pass) is then positioned to shape the surface of the coated blank 200. As noted above, a hydraulic pantograph 216 preferably is used. Briefly, such a pantograph includes an adjustable sensing and control assembly 218, a hydraulic amplifier 220 and a hydraulic follower 222. The sensing and control assembly 218 and the hydraulic follower 222 are mounted in any convenient manner on a tool carriage 224 which in turn may be moved along the bed of the horizontal lathe 202 by the lead screw 226 of such lathe.

The position of the sensor (here stylus 228) is first adjusted. Such adjustment may be made (when a Model CR-10 "Copy-Rite" hydraulic pantograph is used) by adjusting the longitudinal position of the tool carriage 224 and the adjusting screws 230, 232 until the stylus bears against the cylindrical reference area 208 of the template 204. As a result, then, the stylus 228 is caused (during each grinding operation when the tool carriage 224 is moved) to follow the contour of the curved reference surface 206 thereby controlling operation of the sensing and control assembly 218.

The grinding wheel 214 is mounted on a shaft (not numbered) which in turn is rotated by an electrical motor 232. Such motor, in turn, is mounted on a tool slide 234 which is attached to a piston (not shown) in the hydraulic follower 222 of the "Copy-Rite" hydraulic pantograph. Thus, by reason of the mode of operation of such pantograph, the hydraulic follower 222 is caused to move transversely of the horizontal lathe 202 (meaning toward or away from the longitudinal axis of such lathe) to follow any motion of the stylus 228 in that direction. To establish the initial transverse position of the grinding wheel 214, the hydraulic follower adjustment screw 236 is set. It will be observed that normally (meaning before the coated surface has been ground to size) the grinding wheel is brought up against the reference area 201 and then backed off (using a conventional indicator, not shown) so that only a relatively small amount of material (say in the order of 0.0001 inch) is taken off the coated surface during each pass.

It will be observed that as the stylus 228 is moved along the curved reference surface 206, the line of tangency between the stylus 228 and the curved reference surface 206 precesses. To compensate for this effect, the radius of curvature of the cutting surface of the grinding wheel 214 is made the same as the radius of the stylus 228.

With the machine setup just described, the tungsten carbide coating on the mirror blank may be finished to any desired degree of smoothness by repetitively passing the grinding wheel 214 over such surface (after adjusting the initial position of such wheel before each pass and changing wheels as required to compensate for wear and to differentiate between rough and smooth grinding). The horizontal lathe 202 and the tool carriage 224 are, of course, actuated so that, during each pass, all portions of the coated surface are ground. In this connection it is noted that the rotational speeds of the chuck of the horizontal lathe 202 and of the grinding wheel 214 need not be precisely controlled. It has been found that satisfactory results may be obtained simply by running the grinding wheel 214 at a high enough speed that the product of the diameter of the grinding wheel and its rotational speed exceed one hundred times the product of the largest diameter of the workpiece and its rotational speed. It will be observed that during each pass randomly occurring errors will be experienced which, in turn, cause random deviations between the curvature of the ground surface and the curvature of the curved reference surface 206. Such errors, however, tend to cancel one another so that their ultimate effect is almost negligible after many grinding passes.

Referring now to FIG. 2A, the machine setup for lapping softer materials (as the copper and gold layers applied over the smooth tungsten carbide coating) may be seen to differ from the machine setup illustrated in FIG. 2 only in the way in which a lapping tool 250 is pivotably mounted on a reciprocating arm which in turn is actuated by any convenient mechanism 254 mounted on the hydraulic follower 222.

Figure 3:
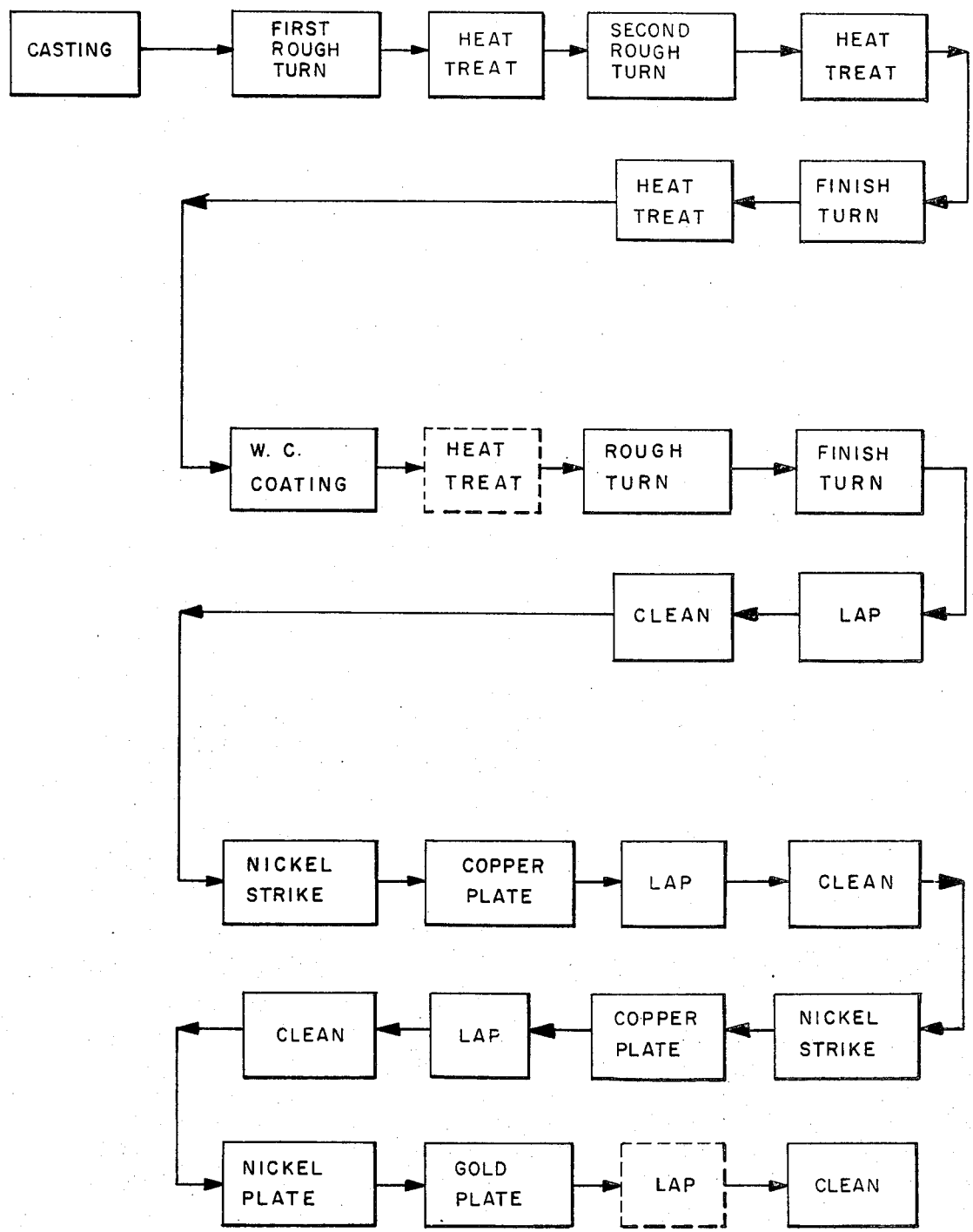
FIG. 3 is a flow chart showing the order in which the steps of the contemplated method are performed.

Referring to FIG. 3 it may be seen that the contemplated method may be followed through the entire process of fabricating any mirror having circular cross-section and quadratic conic longitudinal section, with the physical size of any such mirror being limited primarily by the capacity of the equipment in which the necessary machining is done. In this connection, it is noted here that it is contemplated that all machining, grinding and lapping be accomplished using setups as illustrated in FIGS. 2 and 2A. It is also noted here that the final dimensions of any part after completion of a finish grinding operation are adjusted so that after plating of the mirror surface, the dimensions of such surface are as desired. In other words, it should be recognized that provision is made to accommodate the various layers making up the contemplated mirror so that the finished mirror surface is correctly proportioned.

Referring now specifically to FIG. 3, a casting having the desired contour (within normal casting tolerances) is rough machined to remove any scale and to expose the metal underlying such scale. Even though the preferred material of the casting may be one with a low coefficient of thermal expansion (as "Ni-Resist Iron") the partially machined casting is preferably then heat treated in a conventional oven. With a casting of Ni-Resist Iron, for example, the partially machined casting is heated to 1200° F and furnace cooled. A second rough machining operation is then carried out and the still partially machined casting is again heat treated. The second heat treatment is also carried out in a conventional oven by heating the still partially machined casting to 850°–900° F and furnace cooling. A finish machining operation is then carried out and the resulting fully machined casting is baked at 450° F for 8 hours and furnace cooled to eliminate pore fill contamination.

It is noted here that the finish machining operation is not essential but is desirable if maximum accuracy of the finished mirror is to be attained. It is also noted in this connection that heat treating the partially machined casting between machining operations may contribute to the overall accuracy attained. That is, because the machining setup must, naturally, be realigned after each intermediate heat treatment, even if extreme care is taken in such realignment to eliminate systematic differences, some small differences between setups exist. The curvature of the finally machined surface of the casting then approaches the root mean square curvature of the curvature of such surface for each machining operation. That is, randomly occurring deviations from the desired curvature tend to cancel from grinding operation to grinding operation.

The machined surface of the casting is then coated with a material having a Rockwell "C" hardness equal to, or greater than, 60. It is preferred that the coating material be as hard as and as dense as possible. For this reason, the coating here is tungsten carbide (WC) as noted hereinbefore, applied by a conventional plasma spray process. It is noted here that during any known plasma spray process the base material heating of the casting is controlled to produce a heat treating effect equivalent to the heating during a separate heat treatment. It follows that a separate heat treatment is not necessary. (This is indicated in FIG. 3 by the dashed lines about the step marked "heat treat").

The exposed surface of the tungsten carbide coating is then rough ground to the desired curvature. Because of the hardness of such coating, diamond grinding wheels are used. It is an important, if not essential, part of the contemplated method that the grinding (both rough and smooth) be carried out in such a manner that the effect of machine error is reduced to a minimum. To accomplish such an end: (1) The ratio of the surface feet per minute due to rotation of the grinding wheel to the surface feet per minute due to spindle rotation is maintained in excess of 100:1; (2) The lead advance of the grinding wheel along the surface being machined is maintained at a speed such that the working portion of the grinding wheel contacts overlapping areas on the surface being ground; and (3) the shape of the working portion of the grinding wheel must remain the same during any given pass. Additionally, because of the inherent difficulty in machining materials such as tungsten carbide, the pressure of the working portion of the grinding wheel and the coarseness of the grinding surface must be such that only a thin layer, i.e. a thickness say in the order of 0.0001 inch, of material may be removed in any given pass during the rough grinding operation.

The fact that the coating material is so hard that only a small amount may be removed during any pass, a fact that ordinarily would be a cause of difficulty, has been found to be advantageous in the contemplated method, especially during the rough grinding operation. Because the thickness of a coating such as tungsten carbide may not be controlled within rather wide limits for the present application, it is necessary that that coating be applied rather quickly. That is, the tungsten carbide coating, when applied, is in the order say of 0.008 inch to 0.010 inch too thick. Obviously, then, many passes are required to grind down to the desired curvature. Random deviations from the desired curvature occurring during each different pass then tend to average out, meaning that the error in the curvature of the machined coating after rough grinding approaches the "root mean square" of the random deviations. After the rough grinding has been completed, the finish grinding operation is then carried out in the same way as the rough grinding operation except that a grinding wheel with a finer abrasive is used to attain a surface finish with a roughness in the order of one-half wavelength of the radiant energy with the shortest wavelength to be reflected from the finished mirror surface.

The machine setup is then changed, as shown in FIG. 2A, to allow lapping of the ground coating until the surface roughness is in the order of one-fifth to one-quarter wavelength of the shortest wavelength of the radiant energy to be reflected from the finished mirror surface. The lapping operation ideally has little, if any, effect on the curvature of the ground coating. That is, the lapping operation here is intended to have the same effect as any conventional lapping operation. It is noted, however, that the lapping operation may be used to correct the curvature of each plated surface.

During each grinding and lapping operation, it may (if the curvature of the workpiece changes markedly) be desirable to change the rotational speed of the grinding wheel or the period of the oscillatory motion of the lapping tool to maintain the smoothness of any such operation. Such change may be effected by changing the speed, in any convenient manner (not shown), of the electric motor driving such wheel or tool. Further, it is desirable, between passes, to change the nominal speed of such electrical motor.

With lapping of the ground coating completed, the partially finished mirror is in condition for application of a mirror surface. Before such application it is desirable that any pits in the ground coating be filled. To accomplish this, a nickel strike is applied and a layer of copper deposited on such strike. Such copper layer and nickel strike is then lapped until the ground coating is almost exposed. The result of such operation preparatory to application of the mirror is that any pits in the ground coating are filled. It has been found that, if a gold mirror surface is desired, it is desirable to apply intermediate layers of nickel and copper as shown in FIG. 3. Such layers, when applied and finished as indicated, improve the adherence of the gold. Thus, after cleaning (preferably in a conventional ultrasonic cleaner) successive nickel strikes and layers of copper are plated on the ground coating with each layer of copper being polished. The particular kind of gold finally applied is dependent upon the use to which the mirror is to be put. Here, for example, if the mirror is to be used to direct energy from a high powered laser, it is preferred to use the gold known under the trademark "Orotherm" produced by Technic Incorporated, Cranston, R.I. This particular kind of plating gold is relatively hard, is relatively unaffected by high temperatures and is capable of being lapped or buffed.

Having now described how a curved mirror surface may be formed according to this invention, it wil now become clear that machine errors have relatively little effect on accuracy of such a surface. The most important factors controlling accuracy are the accuracy of the curvature of the template and the accuracy with which the different grinding tools used to shape the tungsten carbide surface may be caused to follow lateral motion of the stylus. The effect of the former factor may be reduced to tolerable proportions by any competent toolmaker. The effect of the latter factor may, if necessary, be observed after any particular grinding pass by measuring the dimensions of the partially machined workpiece. In this connection it will be recognized that conventional meaasurements during any machining oeration (not referred to in connection with any of the Figures) should be made if a single template is to be used throughout the process. Obviously, in such a situation (assuming the template to be ideal for the finished mirror surface) the underlying machined surfaces must be dimensioned to accommodate the layers of material overlying the machined casting. This means that, in the illustrated example of a convex mirror, each successive machined surface must be more and more undersized to accommodate a greater number of intermediate layers. On the other hand, if a concave mirror is to be made, successive machined surfaces must be more and more oversized. In any event, it has been found that optically smooth curved mirrors, both convex and concave, may be made following the disclosed method on conventional lathes, the compliance of the curvature of such mirrors to a desired curvature being in error by not more than $5 \times 10^{-5}$ inches over a length of approximately 10 inches. In one particular case, for example, a concave substantially hyperboloidal mirror (approximately 9 inches in length, with 16 inch and 20 inch diameter apertures), a substantially hyperboloidal convex mirror (approximately 8 inches in length with a base diameter of 4 inches) and a substantially ellipsoidal convex mirror approximately 13 inches in length with a base diameter of 12 inches) were machined on a standard Axelson machinist's lathe following the contemplated method. The machining further was carried out in a conventional machine shop without any precautions taken to avoid machine vibrations or to control the ambient atmosphere in any way.

It will be noted that the method may be changed in some respects without departing from the inventive concepts. For example, it is not essential that the machining of the casting be carried out to the point that an optically smooth surface is obtained. That is, the casting need be machined only to the extent required for a tungsten carbide coating nominally having a thickness (after machining) of something in the order of 0.006 inch ± 0.001 inch. Further, as noted in FIG. 3, it is not essential that there be a separate heat treatment after the tungsten carbide is applied because the heating accompanying the plasma spray process is the equivalent of a separate heat treatment. Still further, as noted in FIG. 3, the lapping of the final gold mirror surface may be dispensed with.

It will also be recognized that the disclosed method may be applied in the machining of mirror surfaces using materials other than those mentioned herein. Thus, the casting may be made from temperature stable metals other than that described hereinbefore; the tungsten-carbide coating may be replaced by other heat resistant materials having a Rockwell "C" hardness equal to, or greater than, 60, or such coating may be applied in any manner equivalent to plasma spraying, as detonation spraying; and the various metals plated on the resulting hard machined surface may be changed to provide, for example, a mirror surface of aluminum.

Having described a reflective mirror according to this invention and a way in which such a mirror may be formed, it will now be apparent that the exact shape and dimensions of mirrors of the type herein contemplated may be changed without departing from the spirit of our inventive concepts.

Further, having once formed a primary intermediate layer on a base in the manner described, intereference coatings rather than reflective coatings may be applied. It is belt, therefore, that this invention should not be restricted to its disclosed embodiment, but rather should be limited only by the scope of the appended claims.

What is claimed is:

1. The method of fabricating a blank for a mirror comprising the steps of:
   (a) casting a base from an alloy of nickel (35%) and iron;
   (b) machining a surface of the base to correspond with the desired contour of the mirror;
   (c) applying, in a plasma jet, a coating of tungsten carbide to the machined surface of the base; and
   (d) grinding the coating of tungsten carbide to correspond with the desired contour of the mirror.

2. The method as in claim 1 comprising, additionally, the steps of:
   (a) applying a first intermediate layer of a metallic material having a Rockwell "C" hardness equal to, or greater than, 60 to the machined surface of the metallic base, the thickness of such first intermediate layer, as applied, being greater than the thickness of such layer in the completed mirror;
   (b) repetitively, during each one of a first plurality of grinding passes, rough grinding the exposed surface of the first intermediate layer to form an optically rough ground surface substantially corresponding in curvature to the curvature of the reflecting surface to be applied, such rough grinding being accomplished by:
      (i) rotating, at a first nominal speed, the metallic base and the first intermediate layer;
      (ii) rotating, at a second nominal speed greater by at least a factor of 100 than the first nominal speed, a rough grinding wheel in contact with the exposed surface of the first intermediate layer; and
      (iii) moving, during each one of the first plurality of grinding passes, the rough grinding wheel along a different one of a like plurality of mean paths, all of such mean paths being parallel to a reference surface having a curvature corresponding to the curvature of the selected arcuate segment and the distance between any successive pair of such mean paths being substantially equal; and
   (c) then repetitively, during each one of a second plurality of grinding passes, finish grinding the exposed surface of the first intermediate layer to form an optically smooth ground surface, such finish grinding being accomplished by repeating steps (b)(i), (b)(ii) and (b)(iii), replacing the rough grinding wheel with a finish grinding wheel.

* * * * *